United States Patent
Nagase et al.

(10) Patent No.: US 7,737,648 B2
(45) Date of Patent: Jun. 15, 2010

(54) MOTOR CONTROLLER

(75) Inventors: Shigeki Nagase, Nabari (JP); Hiroshi Sumasu, Kashihara (JP); Takeshi Ueda, Kashiba (JP)

(73) Assignee: JTEKT Corporation, Osaka (JP)

( * ) Notice: Subject to any disclaimer, the term of this patent is extended or adjusted under 35 U.S.C. 154(b) by 330 days.

(21) Appl. No.: 12/012,432

(22) Filed: Feb. 1, 2008

(65) Prior Publication Data

US 2008/0290826 A1    Nov. 27, 2008

(30) Foreign Application Priority Data

Feb. 8, 2007    (JP)    ............... 2007-029764

(51) Int. Cl.
*H02P 21/00* (2006.01)

(52) U.S. Cl. .............. 318/400.02; 318/400.09; 318/400.01

(58) Field of Classification Search ............ 318/400.02, 318/400.09, 400.01, 400.12, 727; 388/828
See application file for complete search history.

(56) References Cited

U.S. PATENT DOCUMENTS

2009/0216113 A1*    8/2009    Meier et al. ................. 600/424

FOREIGN PATENT DOCUMENTS

JP    2001-268980    9/2001

* cited by examiner

*Primary Examiner*—Karen Masih
(74) *Attorney, Agent, or Firm*—Jordan and Hamburg LLP

(57) ABSTRACT

A motor controller stores values corresponding to predetermined equivalent resistance which corresponds to power loss generated by switching on and off switching elements. Voltage command values are determined by adding voltage drop values determined from values corresponding to the equivalent resistance and values of current flowing in the switching elements to target applied voltage values corresponding to current command values which correspond to target output of a motor. The switching elements arranged in a power supply line to the motor are switched on and off by control signals generated according to the voltage command values.

4 Claims, 12 Drawing Sheets

MOTOR CONTROLLER

FIELD OF THE INVENTION

The present invention relates to a motor controller suitable for controlling, for example, the output of the motor for generating steering assist power in an electric power steering apparatus.

BACKGROUND OF THE INVENTION

In a motor controller comprising switching elements such as MOS-FETs or the like arranged in a power supply line to a motor, current command values corresponding to target output of the motor are determined, target applied voltage values to the motor are calculated based on the current command values, PWM control signals having duty cycle corresponding to the target applied voltage values are generated, and the output of the motor is controlled by switching on and off the switching elements constituting an inverter circuit with the PWM control signals (Japanese Laid-open Patent No. 2001-268980).

SUMMARY OF THE INVENTION

In the motor controller, it is required that the difference between the target output and the actual output of the motor is reduced. However, since the difference is not sufficiently reduced, there is a problem that desirable characteristics cannot be achieved. Especially, when the output of the motor is open-loop controlled, the problem is emphasized. It is an object of the present invention to provide a motor controller that can resolve such a problem.

A motor controller of the present invention for controlling output of a motor by switching on and off switching elements arranged in a power supply line to the motor by control signals comprises a current command value determination part for determining current command values corresponding to a target output of the motor; a calculation part for determining target applied voltage values to the motor corresponding to the current command values; a storage part for storing values corresponding to predetermined equivalent resistance which corresponds to power loss generated by switching on and off the switching elements; a current determination part for determining values of current flowing in the switching elements; a calculation part for determining voltage command values by adding voltage drop values determined from the values corresponding to the equivalent resistance and the values of current flowing in the switching elements to the target applied voltage values; and a signal generating part for generating the control signals according to the voltage command values.

The present invention is based on knowledge that one of causes of the difference between the target output and the actual output of the motor is power loss generated by switching on and off the switching elements. To be more precise, FIG. 12 illustrates an example of relation between the timing of switching on and off the switching elements, power loss of the switching elements and time. Conventionally, it takes no account of such transient power loss generated by switching on and off the switching elements when the voltage command values corresponding to the voltage applied to the motor. Therefore, the voltage applied to the motor drops due to the power loss, so that the difference between the target output and the actual output of the motor is generated.

To the contrary, according to the present invention, the values corresponding to the equivalent resistance which corresponds to the power loss generated by switching on and off the switching elements are predetermined and stored, the voltage command values are determined by adding the voltage drop values determined from the values corresponding to the equivalent resistance and the value flowing in the switching elements to the target applied voltage values, and the output of the motor is controlled by the control signals corresponding to the voltage command values. Therefore, the voltage drop due to the power loss generated by switching on and off the switching elements is compensated, and the difference between the target output and the actual output of the motor can be reduced.

It is preferable that the motor controller of the present invention further comprises a voltage determination part for determining values of voltage applied to the switching elements, wherein values which correspond to the values of current flowing in the switching elements determined by the current determination part and the values of voltage applied to the switching elements determined by the voltage determination part are stored as the values corresponding to the equivalent resistance.

The power loss generated by switching on and off the switching elements varies according to the values of current flowing in the switching elements and the values of voltage applied to the switching elements, so that the difference between the target output and the actual output of the motor can be further reduced by making the values corresponding to the equivalent resistance used to determine the voltage command values correspond to the values of current and the values of voltage.

It is preferable that an output of a three-phase brushless motor is open-loop controlled as the output of the motor via an inverter circuit constituted of the switching elements, U-phase current value, V-phase current value and W-phase current value which are values of current flowing in the respective three-phase coils constituting an armature winding of the motor are determined as values of current flowing in the switching elements, the motor controller further comprises a rotation position determination part for determining rotation positions of a rotor of the motor, a calculation part for calculating an angular velocity of the rotor based on the rotation positions, and a phase current coordinate conversion part for calculating a d-axis current value and a q-axis current value based on the U-phase current value, the V-phase current value, the W-phase current value and the rotation position, in which an axis along the magnetic flux direction of field system of the rotor is taken as the d-axis, and an axis perpendicular to the d-axis and the rotation axis of the rotor is taken as the q-axis, the current command value determination part has dq-axes current command value calculation part for determining a d-axis current command value and a q-axis current command value as the current command values based on the target output of the motor, a d-axis equivalent resistance value and a q-axis equivalent resistance value are stored as the values corresponding to the equivalent resistance, a d-axis target applied voltage value $V_d$ and a q-axis target applied voltage value $V_q$ are determined as the target applied voltage values from the following formulas (1) and (2), $$V_d = (R + PL_d) \cdot I_d^* - \omega \cdot L_q \cdot I_q^* \qquad (1)$$

$$V_q = (R + PL_q) \cdot I_q^* - \omega \cdot L_d \cdot I_d^* + \omega \cdot \Phi \qquad (2)$$

a d-axis voltage drop value $\delta V_d$ and a q-axis voltage drop value $\delta V_q$ are determined as the voltage drop values from the following formulas (3) and (4), $$\delta V_d = R_d \cdot I_d \qquad (3)$$

$$\delta V_q = R_q \cdot I_q \qquad (4)$$

a d-axis voltage command value $V_d{}^*$ and a q-axis voltage command value $V_q{}^*$ are determined as the voltage command values from the following formulas (5) and (6), $$V_d{}^* = V_d + \delta V_d \quad (5)$$

$$V_q{}^* = V_q + \delta V_q \quad (6)$$

in formulas (1) through (6), $R_d$ stands for a d-axis equivalent resistance value, $R_q$ stands for a q-axis equivalent resistance value, $I_d$ stands for a d-axis current value, $I_q$ stands for a q-axis current value, R stands for a predetermined resistance value of the three-phase coils, P stands for a differential operator, $L_d$ stands for a predetermined d-axis self-inductance of the three-phase coils, $L_q$ stands for a predetermined q-axis self-inductance of the three-phase coils, $I_d{}^*$ stands for a d-axis current command value, $I_q{}^*$ stands for a q-axis current command value, ω stands for an angular velocity of the rotor, Φ is a value predetermined by multiplying a maximum value of magnetic flux linkage of the three-phase coils by $(3/2)^{1/2}$.

As a result, the difference between the target output and the actual output of the three-phase brushless motor open-loop controlled via the inverter circuit can be reduced.

According to the motor controller of the present invention, the difference between the target output and the actual output of the motor can be reduced, so that the motor can be sufficiently performed.

DETAILED DESCRIPTION OF THE INVENTION

Figure 1:
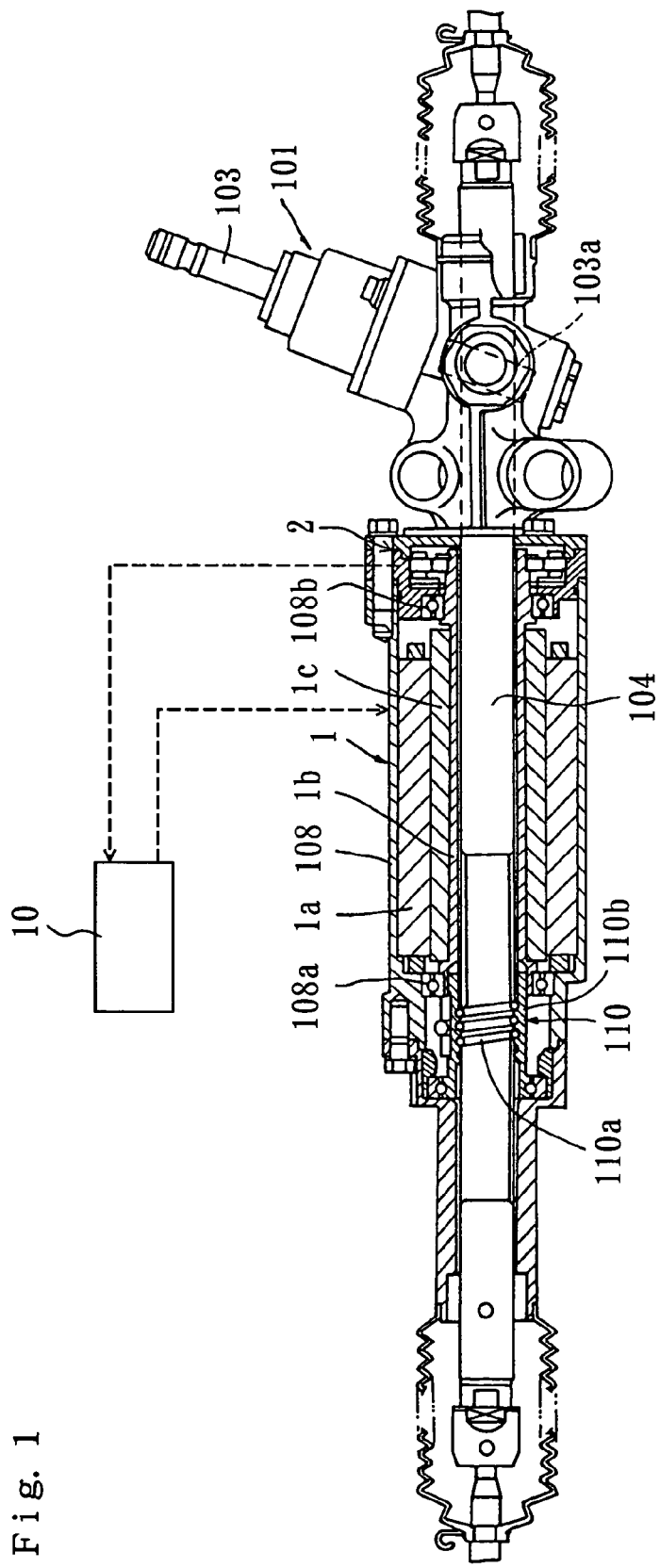
FIG. 1 is a partial broken front view of an electric power steering apparatus of an embodiment of the present invention.

An electric power steering device 101 of a rack-pinion type for a vehicle in an embodiment of the present invention, which is shown by FIG. 1, comprises a steering shaft 103 that is rotated by steering operation, a pinion 103a provided on the steering shaft 103, a rack 104 engaged with the pinion 103a, a three-phase brushless motor 1 for generating steering assist power, and a ball screw mechanism 110 for transmitting the output of the motor 1 to the rack 104. Each end of the rack 104 is linked to a wheel (not shown in the figures). When the pinion 103a is rotated by steering operation, the rack 104 moves in the lateral direction of the vehicle, and the steering angle varies due to the movement of the rack 104.

The motor 1 comprises a stator 1a that is fixed to a housing 108 covering the rack 104, a cylindrical rotor 1b that is rotatably supported by the housing 108 via bearings 108a, 108b, and a magnet 1c provided as a field system of the rotor 1b. The stator 1a has U-phase coil, V-phase coil and W-phase coil constituting an armature winding of the motor 1. The rotor 1b surrounds the rack 104. A resolver 2 serves as a rotation position determination part for determining rotation positions of the rotor 1b, and outputs rotation angles of the rotor 1b from a reference position of the stator 1a as the rotation positions.

The ball screw mechanism 110 has a ball screw shaft 110a integrally formed on the outer periphery of the rack 104 and a ball nut 110b engaged with the ball screw shaft 110a via balls. The ball nut 110b is connected to the rotor 1b. As a result, when the motor 1 rotates the ball nut 110b, the steering assist power is provided along the longitudinal direction of the rack 104. The motor 1 is connected to a controller 10.

Figure 2:
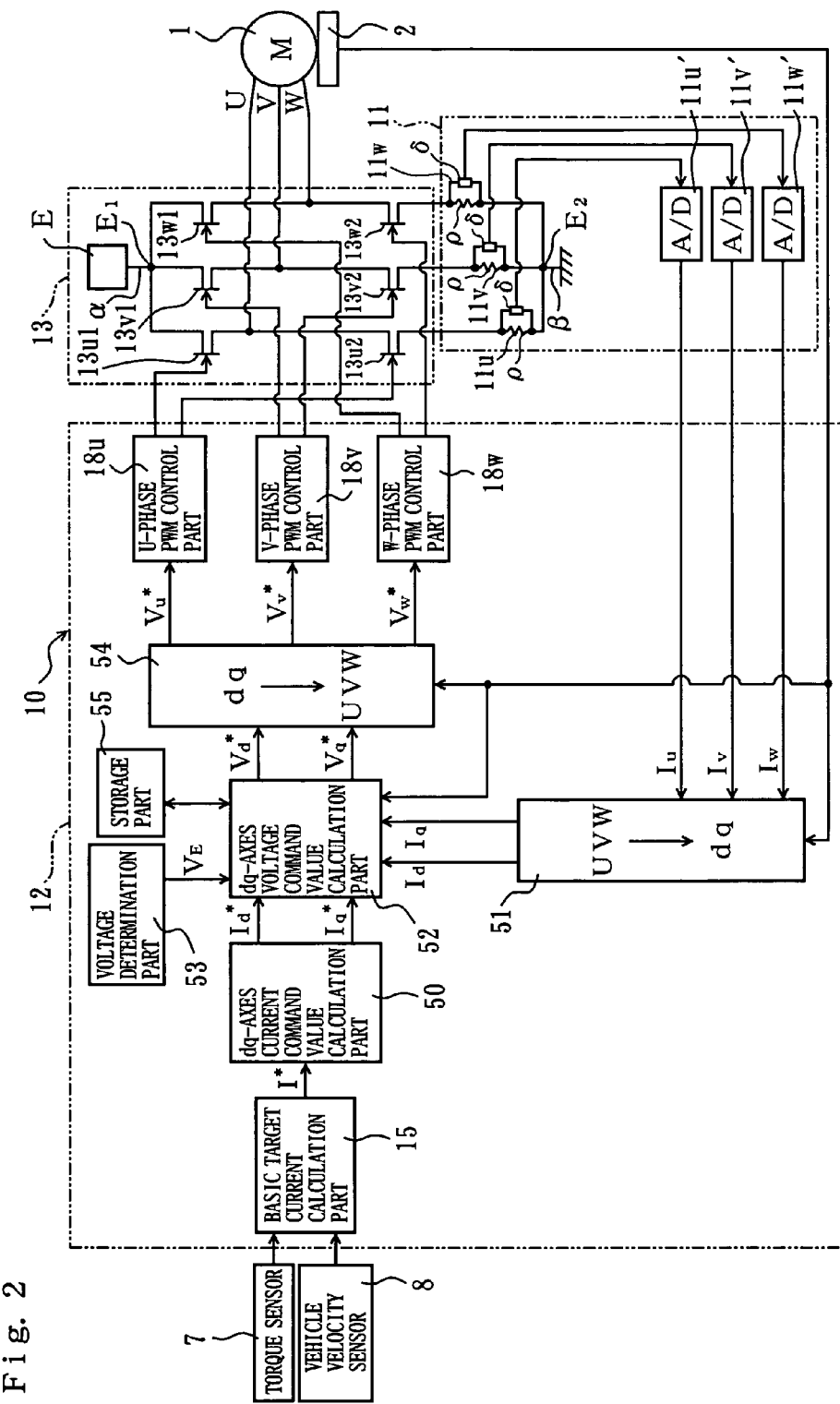
FIG. 2 is a drawing illustrating the constitution of a motor controller of the first embodiment of the present invention.

FIG. 2 is a function block diagram of the controller 10 of the first embodiment. The resolver 2, a torque sensor 7 that detects the steering torque transmitted by the steering shaft 103 and a vehicle velocity sensor 8 that detects the vehicle velocity are connected to the controller 10. The controller 10 has a current determination part 11, a signal processing part 12 and a drive part 13. The drive part 13 has a pair of U-phase MOS-FET 13u1, 13u2, a pair of V-phase MOS-FET 13v1, 13v2 and a pair of W-phase MOS-FET 13w1, FET13w2 as switching elements arranged in a power supply line to the motor 1. The FETs 13u1, 13u2, 13v1, 13v2, 13w1, 13w2 constitute an inverter circuit, and are switched on and off by PWM control signals to open-loop control the output of the motor 1 via the inverter circuit.

The current determination part 11 determines U-phase current value $I_u$, V-phase current value $I_v$ and W-phase current value $I_w$, which are values of current flowing in the three-phase coils as values of actual current flowing in the respective FET 13u1, 13u2, 13v1, 13v2, 13w1, 13w2. The current detection part 11 of the present embodiment has current detectors 11u, 11v, 11w and AD converter 11u', 11v', 11w' that perform AD conversion of current detection signals produced by the current detectors 11u, 11v, 11w. Each of the current detectors 11u, 11v, 11w has a current detection resistance ρ and a detection circuit δ. Each of the current detection resistor ρ is arranged between the ground terminal and each of the lower arm FETs 13u2, 13v2, 13w2. Each of the detection circuit δ amplifies the current flowing through the current detection resistor ρ to output the current detection signal.

The constitution of the current determination part 11 is not particularly limited as long as the current flowing through the FET 13u1, 13u2, 13v1, 13v2, 13w1, 13w2 can be determined. For example, each of the current detectors can be arranged in the upstream position of each of the upper arm FETs 13u1, 13v1, 13w1 or in the position between each of the upper arm FETs 13u1, 13v1, 13w1 and each of the lower arm FETs 13u1, 13v1, 13w1. Furthermore, instead of providing three current detectors 11u, 11v, 11w, the respective phase current values $I_u$, $I_v$, $I_w$ can be determined by calculation based on switching timing of the FET $13u1$, $13u2$, $13v1$, $13v2$, $13w1$, $13w2$ and detected current with a current detector having a single current detection resistor arranged in either position α or position β in FIG. 2. Furthermore, the phase current values in one or two of the three-phases can be determined by the current detector, and the remaining phase current values can be determined by calculation.

The signal processing part 12 is comprised of a computer storing a control program, and has a basic target current calculation part 15, a dq-axes current command value calculation part 50, a phase current coordinate conversion part 51, a dq-axes voltage command value calculation part 52, a voltage determination part 53, a voltage coordinate conversion part 54, a storage part 55 and PWM (pulse width modulation) control parts $18u$, $18v$, $18w$ for the respective three-phase coils. The storage part 55 can be constituted by an area of a memory device storing the control program or by another memory device.

In the basic target current calculation part 15, a basic target current value I* is calculated based on the steering torque detected by the torque sensor 7 and the vehicle velocity detected by the vehicle velocity sensor 8. The calculation of the basic target current value I* can be performed by a known method; for example, as the value of the steering torque becomes larger and the vehicle velocity becomes smaller, the basic target current value I* becomes larger. Furthermore, the method for determining the basic target current value I* is not particularly limited, and an arbitrary method can be adopted.

The basic target current value I* calculated in the basic target current calculation part 15 is input to the dq-axes current command value calculation part 50. The dq-axes current command value calculation part 50 determines the d-axis current command value $I_d^*$ and q-axis current command value $I_q^*$ as the current command values based on the basic target current value I*. To be more precise, the d-axis current command value $I_d^*$ for generating magnetic field in the d-axis direction and the q-axis current command value $I_q^*$ for generating magnetic field in the q-axis direction are calculated in the dq coordinate system, in which an axis along the magnetic flux direction of the field system (magnet $1c$) of the rotor $1b$ is taken as the d-axis, and an axis perpendicular to the d-axis and the rotation axis of the rotor $1b$ is taken as the q-axis. Here, the q-axis current command value $I_q^*$ corresponds to the target output torque of the motor 1. The calculation in the dq-axes current command value calculation part 50 can be performed by using known calculation formulas. Therefore, in the present embodiment, the basic target current calculation part 15 and the dq-axes current command value calculation part 50 serve as the current command value determination part for determining the current command values corresponding to the target output of the motor 1. The constitution of the current command value determination part is not particularly limited as long as the current command values corresponding to the target output of the motor 1 are determined, for example, a constitution which sets constant values as the current command values can be adopted.

The phase current coordinate conversion part 51 calculates the d-axis current value $I_d$ and the q-axis current value $I_q$ based on the phase current values $I_u$, $I_v$, $I_w$ determined by the current determination part 11 and the rotation positions of the rotor $1b$ detected by the resolver 2. The calculation in the phase current coordinate conversion part 51 can be performed by using known calculation formulas.

The voltage determination part 53 determines values $V_E$ of actual voltage applied to the FETs $13u1$, $13u2$, $13v1$, $13v2$, $13w1$, $13w2$. The voltage determination part 53 in the present embodiment can be constituted by a known voltage detector which outputs signals corresponding to detected values of voltage between the connecting points, which are shown by E1 and E2 in FIG. 2, in the inverter circuit.

Figure 3:
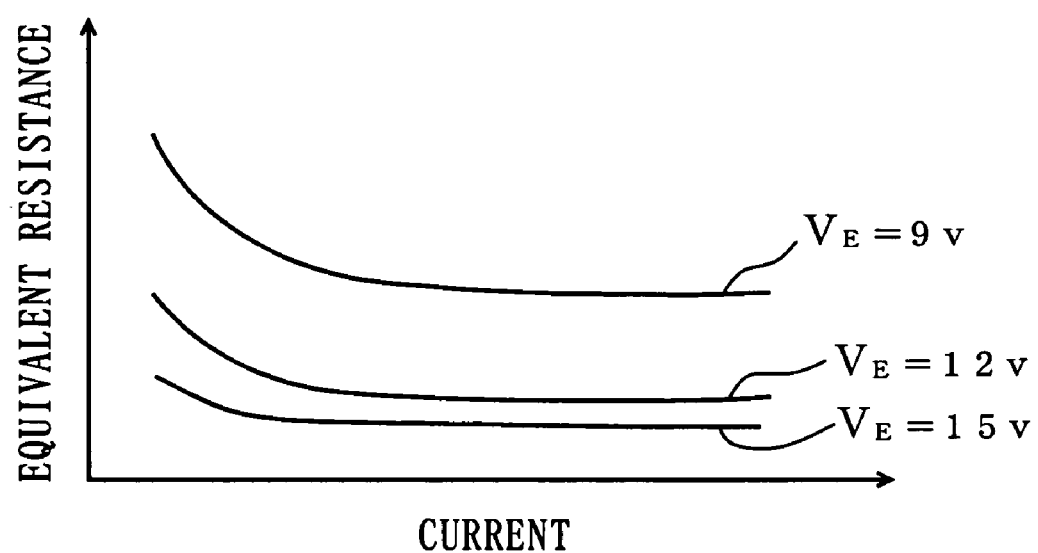
FIG. 3 is a drawing showing an example of relations between the values of current flowing in FETs, the values of voltage applied to the FETs and equivalent resistance values.

The storage part 55 stores predetermined equivalent resistance values which correspond to power loss generated by switching on and off the FETs $13u1$, $13u2$, $13v1$, $13v2$, $13w1$, $13w2$. In the present embodiment, a d-axis equivalent resistance value $R_d$ and a q-axis equivalent resistance value $R_q$, which corresponds to values of actual current flowing in the FETs $13u1$, $13u2$, $13v1$, $13v2$, $13w1$, $13w2$ and values of actual voltage applied to the FETs $13u1$, $13u2$, $13v1$, $13v2$, $13w1$, $13w2$, are stored as the equivalent resistance values. FIG. 3 shows an example of relations between the values of current flowing in the FETs, the values $V_E$ of voltage applied to the FETs and the equivalent resistance values, and the values corresponding to such relations are stored. To be more precise, a relation between the d-axis current value $I_d$ determined by the phase current coordinate conversion part 51, the voltage value $V_E$ determined by the voltage determination part 53 and the d-axis equivalent resistance value $R_d$ is predetermined and stored as a form of table or calculation formula or the like, furthermore, a relation between the q-axis current value $I_q$ determined by the phase current coordinate conversion part 51, the voltage value $V_E$ determined by the voltage determination part 53 and the q-axis equivalent resistance value $R_q$ is predetermined and stored as a form of table or calculation formula or the like.

Furthermore, resistance R of the three-phase coils, d-axis self-inductance $L_d$, q-axis self-inductance $L_q$, a value Φ obtained by multiplying a maximum value of magnetic flux linkage of the three-phase coils by $(3/2)^{1/2}$ in the above-mentioned formulas (1) and (2) are predetermined and stored in the storage part 55.

The dq-axes voltage command value calculation part 52 determines the voltage command values by adding the voltage drop values determined from the above-mentioned equivalent resistance values and values of current flowing in the FET $13u1$, $13u2$, $13v1$, $13v2$, $13w1$, $13w2$ to the target applied voltage values determined from the current command values and the relation expressed by the formulas (1) and (2). To be more precise, the dq-axes voltage command value calculation part 52 determines the d-axis target applied voltage value $V_d$ and q-axis target applied voltage value $V_q$ which are target applied voltage values, from the d-axis current command value $I_d^*$ and q-axis current command value $I_q^*$ determined by the dq-axes current command value calculation part 50 and the formulas (1) and (2), so that it serves as a calculation part for determining the target applied voltage values of the motor 1 corresponding to the current command values. Furthermore, the dq-axes voltage command value calculation part 52 determines a d-axis voltage drop value $\delta V_d$ and a q-axis voltage drop value $\delta V_q$ as voltage drop values from the d-axis current value $I_d$ and q-axis current value $I_q$ determined by the phase current coordinate conversion part 51 and the above-mentioned formulas (3) and (4), and determines the d-axis voltage command value $V_d^*$ and q-axis voltage command value $V_q^*$ as the voltage command values from the above-mentioned formulas (5) and (6). Here, the dq-axes voltage command value calculation part 52 serves as a calculation part for calculating angular velocity ω of the rotor $1b$ based on the rotation positions of the rotor $1b$ inputted in time series from the resolver 2, and read the d-axis equivalent resistance value $R_d$ and q-axis equivalent resistance value $R_q$ from the storage part 55 based on the voltage value $V_E$ determined by the voltage determination part 53 and the d-axis current value $I_d$ and q-axis current value $I_q$ determined by the phase current coordinate conversion part 51.

In the present embodiment, the voltage coordinate conversion part 54 and PWM control parts 18u, 18v, 18w serve as the signal generating part for generating the PWM control signals for switching on and off the FET 13u1, 13u2, 13v1, 13v2, 13w1, 13w2 according to the d-axis voltage command value $V_d^*$ and q-axis voltage command value $V_q^*$ which are voltage command values.

To be more precise, in the voltage coordinate conversion part 54, the U-phase voltage command value $V_u^*$, V-phase voltage command value $V_v^*$ and W-phase voltage command value $V_w^*$ are calculated based on the d-axis voltage command value $V_d^*$, the q-axis voltage command value $V_q^*$ and the rotation positions of the rotor 1b detected by the resolver 2. The calculation in the voltage coordinate conversion part 54 can be performed by using known calculation formulas.

The respective PWM control parts 18u, 18v, 18w generates PWM control signals that are pulse signals having duty cycle corresponding to the voltage command values $V_u^*, V_v^*, V_w^*$ of the respective phases. The FETs 13u1, 13u2, 13v1, 13v2, 13w1, 13w2 of the drive part 13 are switched on and off by the PWM control signals so that the voltage applied by a battery E to the coils of respective phases of the motor 1 corresponds to the voltage command values $V_u^*, V_v^*, V_w^*$. To be more precise, in the U-phase of the inverter circuit, when the PWM control signal inputted to the gate of one of the upper arm FET 13u1 and the lower arm FET 13u2 is high pulse, the PWM control signal inputted to the gate of the other is low pulse, and dead time is set between the falling edge of one of the PWM control signals and the rising edge of the other. It's same in the V-phase and W-phase. As a result, voltage corresponding to the target output is applied to the three-phase coils of the motor, and the motor is driven.

Figure 4:
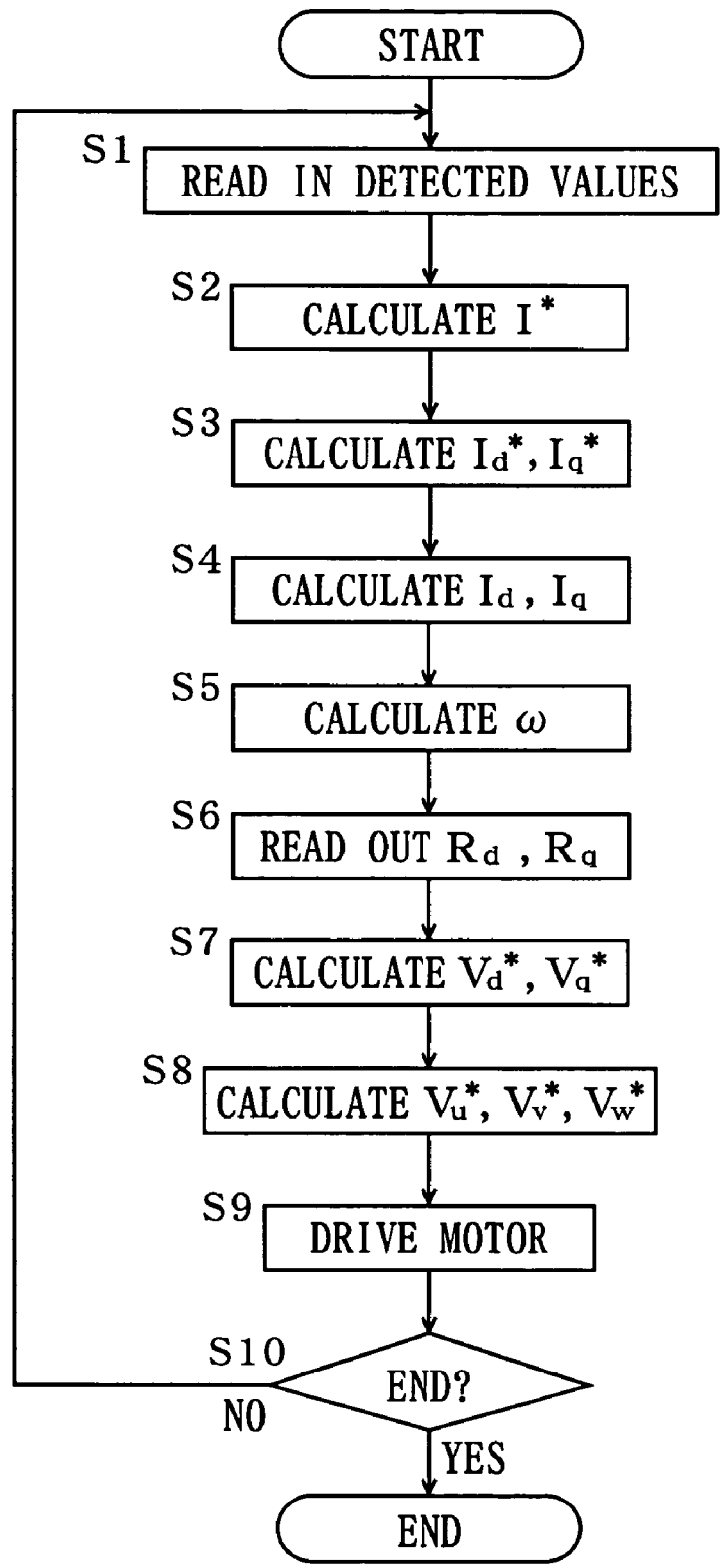
FIG. 4 is a flowchart showing control procedures of the motor controller of the first embodiment in the present invention.

The flowchart of FIG. 4 shows a control procedure with the controller 10 of the first embodiment for the motor 1. First, the detected values by the resolver 2, the torque sensor 7, the vehicle velocity sensor 8, the current detectors 11u, 11v, 11w, and the voltage determination part 53 are read (step S1), and the basic target current value I* is calculated based on the detected torque and vehicle velocity (step S2). The d-axis current command value $I_d^*$ and q-axis current command value $I_q^*$ corresponding to the basic target current value I* are calculated (step S3), the d-axis current value $I_d$ and q-axis current value $I_q$ corresponding to the detected phase current values $I_u, I_v, I_w$ and rotation positions of the rotor 1b are calculated (step S4), and the angular velocity ω of the rotor 1 is calculated based on the rotation positions of the rotor 1b determined in time series (step S5). The d-axis equivalent resistance value $R_d$ and q-axis equivalent resistance value $R_q$ corresponding to the calculated d-axis current value $I_d$, calculated q-axis current value $I_q$ and detected voltage value $V_E$ are read from the storage part 55 (step S6). Next, the d-axis voltage command value $V_d^*$ and q-axis voltage command value $V_q^*$ are calculated based on the calculated d-axis current command value $I_d^*$, calculated q-axis current command value $I_q^*$, calculated d-axis current value $I_d$, calculated q-axis current value $I_q$, calculated angular velocity ω, read d-axis equivalent resistance value $R_d$, read q-axis equivalent resistance value $R_q$, and relation expressed by formulas (1) through (6) (step S7). The U-phase voltage command value $V_u^*$, V-phase voltage command value $V_v^*$ and W-phase voltage command value $V_w^*$ corresponding to the calculated d-axis voltage command value $V_d^*$ and q-axis voltage command value $V_q^*$ are calculated (step S8). The PWM control signals corresponding to the calculated voltage command values $V_u^*, V_v^*, V_w^*$ of the respective phases are generated, and the motor 1 is driven by switching on and off the FETs 13u1, 13u2, 13v1, 13v2, 13w1, 13w2 by the PWM control signals (step S9), whether the control is to be ended is judged based on, for example, ON/OFF state of the ignition switch (step S10), and the processing flow returns to step S1 in a state where the control is not to be ended.

Figure 5:
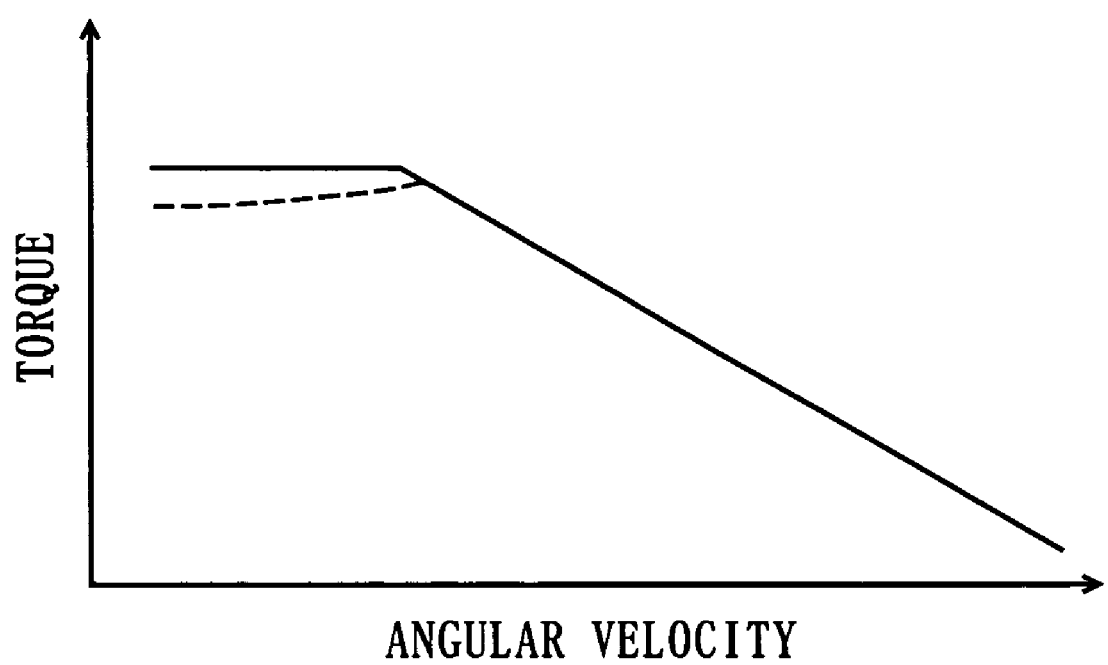
FIG. 5 is a drawing showing relations between angular velocity and output torque of a motor when the motor is controlled by the motor controller of the first embodiment of the present invention and when the motor is controlled by a motor controller of the prior art.

According to the above-mentioned embodiment, the d-axis equivalent resistance value $R_d$ and q-axis equivalent resistance value $R_q$ corresponding to the power loss generated by switching on and off the FET 13u1, 13u2, 13v1, 13v2, 13w1, 13w2 are predetermined and stored, the d-axis voltage command value $V_d^*$ is determined by adding the d-axis voltage drop value $\delta V_d$ determined from the d-axis equivalent resistance value $R_d$ and d-axis current value $I_d$ to the d-axis target applied voltage value $V_d$, the q-axis voltage command value $V_q^*$ is determined by adding the q-axis voltage drop value $\delta V_q$ determined from the q-axis equivalent resistance value $R_q$ and q-axis current value $I_q$ to the q-axis target applied voltage value $V_q$, and the output of the motor 1 is controlled by the control signals corresponding to the voltage command values $V_d^*$ and $V_q^*$. Therefore, the voltage drops due to the power loss generated by switching on and off the FET 13u1, 13u2, 13v1, 13v2, 13w1, 13w2 is compensated, and the difference between the target output and the actual output of the three-phase brushless the motor 1 open-loop controlled via the inverter circuit can be reduced. Furthermore, by making the equivalent resistance values $R_d, R_q$ used for determining the voltage command values $V_d^*, V_q^*$ correspond to the current values flowing in the FETs 13u1, 13u2, 13v1, 13v2, 13w1, 13w2 and the voltage values applied to the FETs 13u1, 13u2, 13v1, 13v2, 13w1, 13w2, the difference between the target output, and the actual output of the motor 1 can be further reduced. Therefore, the motor 1 can be sufficiently performed and the capability of the electric power steering apparatus can be improved. FIG. 5 shows relations between the angular velocity and the output torque of the motor 1, in which the relation in the above-mentioned embodiment where the voltage drop values $\delta V_d, \delta V_q$ are added to the target applied voltage values $V_d, V_q$ is expressed by a solid line, and the relation in the prior art where the voltage drop values $\delta V_d, \delta V_q$ are not added to the target applied voltage values $V_d, V_q$ is expressed by a broken line, and it can be confirmed that the reduction of the output torque is prevented in the above-mentioned embodiment in comparison with the prior art.

Figure 6:
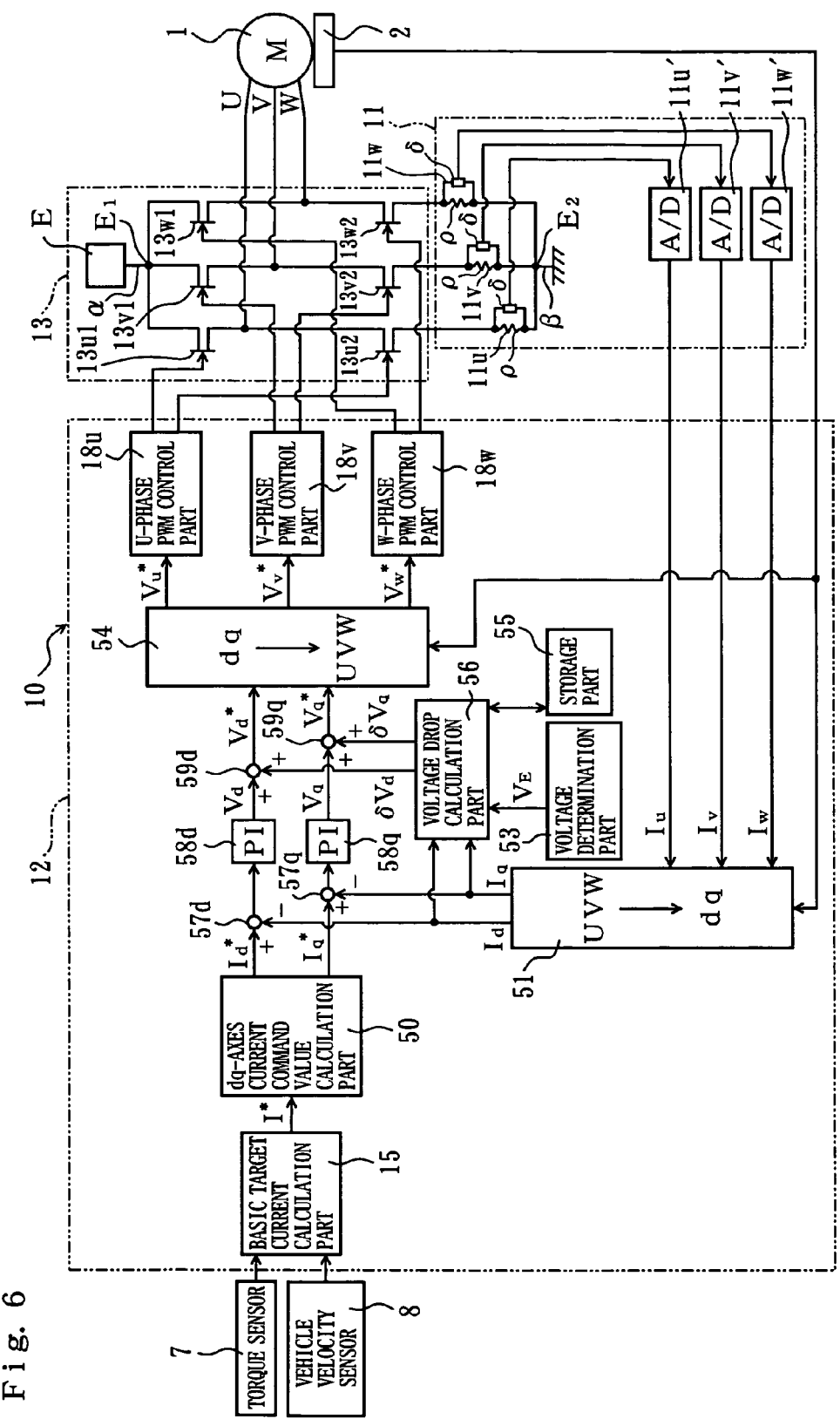
FIG. 6 is a drawing illustrating the constitution of a motor controller of the second embodiment of the present invention.

FIG. 6 shows a function block diagram of a controller 10 of the second embodiment. The difference in the second embodiment from the first embodiment is that the motor 1 is feedback controlled. The parts that are the same as the first embodiment are indicated by the same reference symbols, and the differences are explained.

The signal processing part 12 has a voltage drop calculation part 56, a d-axis difference calculation part 57d, a q-axis difference calculation part 57q, a d-axis PI calculation part 58d, a q-axis PI calculation part 58q, a d-axis addition part 59d and a q-axis addition part 59q instead of the dq-axes voltage command value calculation part 52 of the first embodiment.

The voltage drop calculation part 56 determines a d-axis voltage drop value $\delta V_d$ and a q-axis voltage drop value $\delta V_q$ as the voltage drop values from the d-axis current value $I_d$, q-axis current value $I_q$ and above-mentioned formulas (3) and (4). Here, the d-axis equivalent resistance value $R_d$ and q-axis equivalent resistance value $R_q$ are read from the storage part 55 based on the voltage value $V_E$ determined by the voltage determination part 53 and the d-axis current value $I_d$ and q-axis current value $I_q$ determined by the phase current coordinate conversion part 51.

The d-axis difference calculation part 57d determines the difference between the d-axis current command value $I_d^*$ and the d-axis current value $I_d$ determined by the phase current coordinate conversion part 51, the d-axis target applied voltage value $V_d$ is determined by carrying out the PI calculation of the difference in the d-axis PI calculation part 58d. The q-axis difference calculation part 57q determines the difference between the q-axis current command value $I_q^*$ and the q-axis current value $I_q$ determined by the phase current coordinate conversion part 51, the q-axis target applied voltage value $V_q$ is determined by carrying out the PI calculation of the difference in the q-axis PI calculation part 58q. As a result, the d-axis difference calculation part 57d, the q-axis difference calculation part 57q, the d-axis PI calculation part 58d and the q-axis PI calculation part 58q serve as the calculation part for determining the target applied voltage values to the motor 1 corresponding to the current command values.

The d-axis addition part 59d determines the d-axis voltage command value $V_d^*$ by adding the d-axis voltage drop value $\delta V_d$ to the d-axis target applied voltage value $V_d$ as expressed by the formula (5), and the q-axis addition part 59q determines the q-axis voltage command value $V_q^*$ by adding the q-axis voltage drop value $\delta V_q$ to the q-axis target applied voltage value $V_q$ as expressed by the formula (6). As a result, the voltage drop calculation part 56, the d-axis addition part 59d and the q-axis addition part 59q constitute the calculation part for determining the voltage command values.

Figure 7:
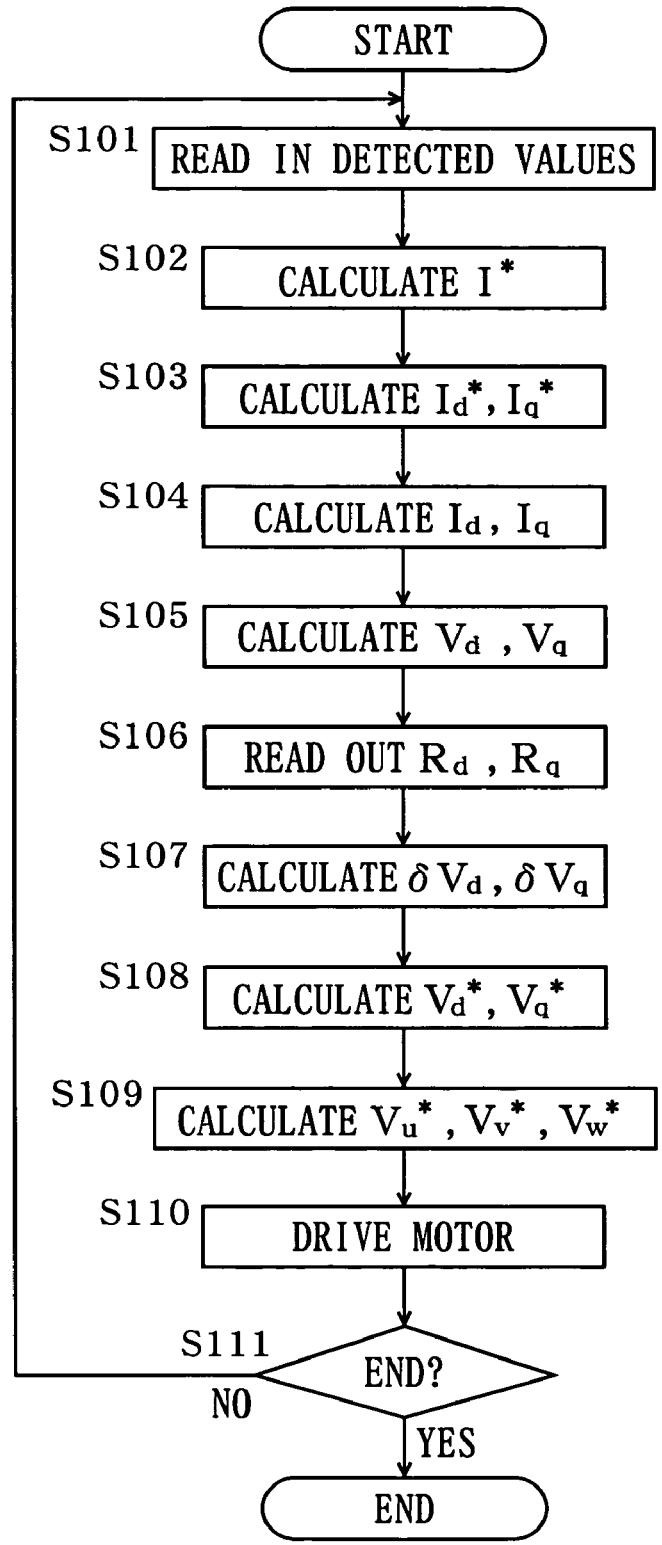
FIG. 7 is a flowchart showing control procedures of the motor controller of the second embodiment of the present invention.

The flowchart of FIG. 7 shows a control procedure with the controller 10 of the second embodiment for the motor 1.

First, the detected values by the resolver 2, the torque sensor 7, the vehicle velocity sensor 8, the current detectors 11u, 11v, 11w, and the voltage determination part 53 are read (step S101), and the basic target current value I* is calculated based on the detected torque and vehicle velocity (step S102). The d-axis current command value $I_d^*$ and q-axis current command value $I_q^*$ corresponding to the basic target current value I* are calculated (step S103), the d-axis current value $I_d$ and q-axis current value $I_q$ corresponding to the detected phase current values $I_u$, $I_v$, $I_w$ and rotation positions of the rotor 1b are calculated (step S104), the d-axis target applied voltage value $V_d$ is calculated by the PI calculation of the difference between the calculated d-axis current command value $I_d^*$ and the calculated d-axis current value $I_d$, and the q-axis target applied voltage value $V_q$ is calculated by the PI calculation of the difference between the calculated q-axis current command value $I_q^*$ and the calculated q-axis current value $I_q$ (step S105). The d-axis equivalent resistance value $R_d$ and q-axis equivalent resistance value $R_q$ corresponding to the calculated d-axis current value $I_d$, calculated q-axis current value $I_q$ and detected voltage value $V_E$ are read from the storage part 55 (step S106). Next, the d-axis voltage drop value $\delta V_d$ and q-axis voltage drop value $\delta V_q$ are calculated from the calculated d-axis current value $I_d$, calculated q-axis current value $I_q$, read equivalent resistance values $R_d$, $R_q$ and relation expressed by the formulas (3) and (4) (step S107), the d-axis voltage command value $V_d^*$ is calculated by adding the calculated d-axis target applied voltage value $V_d$ and the calculated d-axis voltage drop value $\delta V_d$, and the q-axis voltage command value $V_q^*$ is calculated by adding the calculated q-axis target applied voltage value $V_q$ and the calculated q-axis voltage drop value $\delta V_q$ (step S108). The U-phase voltage command value $V_u^*$, V-phase voltage command value $V_v^*$ and W-phase voltage command value $V_w^*$ corresponding to the calculated d-axis voltage command value $V_d^*$ and calculated q-axis voltage command value $V_q^*$ are calculated (step S109). The PWM control signals corresponding to the calculated voltage command values $V_u^*$, $V_v^*$, $V_w^*$ of the respective phases are generated, and the motor 1 is driven by switching on and off the FETs 13u1, 13u2, 13v1, 13v2, 13w1, 13w2 by the PWM control signals (step S110), whether the control is to be ended is judged based on, for example, ON/OFF state of the ignition switch (step S111), and the processing flow returns to step S101 in a state where the control is not to be ended. Other features are similar to those of the first embodiment.

Figure 8:
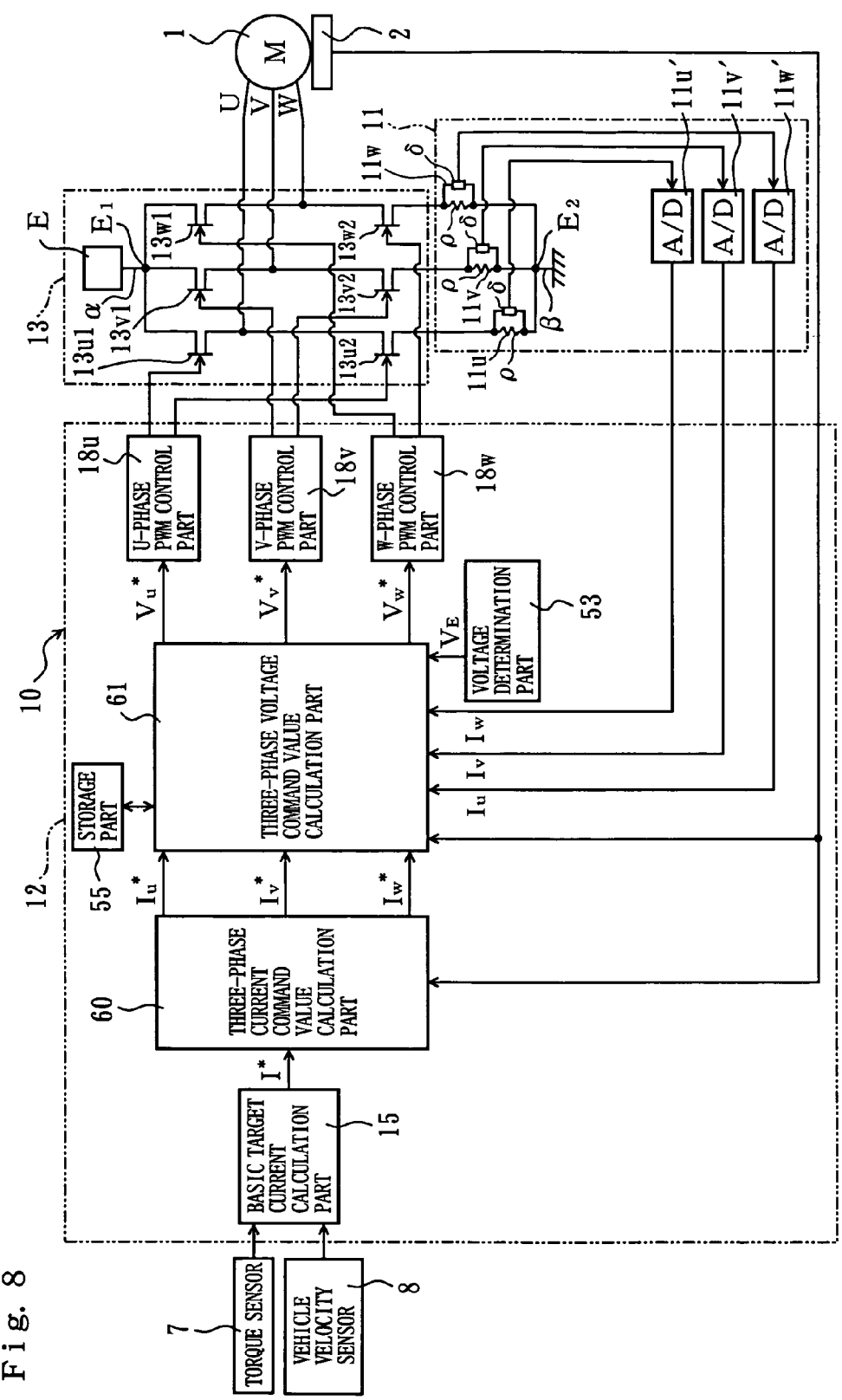
FIG. 8 is a drawing illustrating the constitution of a motor controller of the third embodiment of the present invention.

FIG. 8 shows a function block diagram of a controller 10 of the third embodiment. The difference in the third embodiment from the first embodiment is that the basic target current I* is determined from the respective phase voltage command values $V_u^*$, $V_v^*$, $V_w^*$ without carrying out the calculation in the dq coordinate system. The parts that are the same as the first embodiment are indicated by the same reference symbols, and the differences are explained.

The signal processing part 12 has a three-phase current command value calculation part 60 and a three-phase voltage command value calculation part 61 instead of the dq-axes current command value calculation part 50, the phase current coordinate conversion part 51, the dq-axes voltage command value calculation part 52 and the voltage coordinate conversion part 54 of the first embodiment.

The three-phase current command value calculation part 60 calculates the respective U-phase current command value $I_u^*$, V-phase current command value $I_v^*$ and W-phase current command value $I_w^*$ of the three-phase coils as the current command values based on the basic target current value I*. The calculation in the three-phase current command value calculation part 60 can be performed by a known method. Therefore, in the present embodiment, the basic target current calculation part 15 and the three-phase current command value calculation part 60 serve as the current command value determination part for determining the current command values corresponding to the target output of the motor 1.

The storage part 55 stores a U-phase equivalent resistance value $R_u$, a V-phase equivalent resistance value $R_v$ and a W-phase equivalent resistance value $R_w$ as the equivalent resistance values. To be more precise, a relation between the U-phase current value $I_u$ determined by the current determination part 11, the voltage value $V_E$ determined by the voltage determination part 53 and the U-phase equivalent resistance value $R_u$ is predetermined and stored as a form of table or calculation formula or the like, a relation between the V-phase current value $I_v$ determined by the current determination part 11, the voltage value $V_E$ determined by the voltage determination part 53 and the V-phase equivalent resistance value $R_v$ is predetermined and stored as a form of table or calculation formula or the like, and a relation between the W-phase current value $I_w$ determined by the current determination part 11, the voltage value $V_E$ determined by the voltage determination part 53 and the W-phase equivalent resistance value $R_w$ is predetermined and stored as a form of table or calculation formula or the like.

The three-phase voltage command value calculation part 61 determines the U-phase target applied voltage value $V_u$, V-phase target applied voltage value $V_v$ and W-phase target applied voltage value $V_w$, which are the target applied voltage values, from the respective phase current command values $I_u^*$, $I_v^*$, $I_w^*$ determined by the three-phase current command value calculation part 60 and the following formulas (7) through (9), so that it serves as a calculation part for determining the target applied voltage values to the motor 1 corresponding to the current command values.

$$V_u = (R+PL) \cdot I_u^* - PM \cdot (I_v^* + I_w^*)/2 + E_u \quad (7)$$

$$V_v = (R+PL) \cdot I_v^* - PM \cdot (I_u^* + I_w^*)/2 + E_v \quad (8)$$

$$V_w = (R+PL) \cdot I_w^* - PM \cdot (I_u^* + I_v^*)/2 + E_w \quad (9)$$

Here, in the formulas (7) through (9), R is resistance of the three-phase coils, L is the self-inductance of the respective three-phase coils, and M is mutual inductance between the three phase coils, which are predetermined and stored in the storage part 55 respectively. Furthermore, $E_u$, $E_v$ and $E_w$ are speed electromotive forces induced in the respective three-phase coils, which are determined by multiplying a predetermined counter electromotive force constant that is particular to the motor 1 by an angular velocity ω calculated based on the rotation positions of the rotor 1b inputted in time series from the resolver 2. P stands for a differential operator.

Furthermore, the three-phase voltage command value calculation part 61 determines the U-phase voltage drop value $\delta V_u$, V-phase voltage drop value $\delta V_v$ and W-phase voltage drop value $\delta V_w$ as the voltage drop values from the respective phase current values $I_u$, $I_v$, $I_w$ determined by the current determination part 11 and the following formulas (10) through (12). Here, the respective phase equivalent resistance values $R_u$, $R_v$, $R_w$ are read from the storage part 55 based on the respective phase current values $I_u$, $I_v$, $I_w$ determined by the current determination part 11 and the voltage value $V_E$ determined by the voltage determination part 53.

$$\delta V_u = R_u \cdot I_u \tag{10}$$

$$\delta V_v = R_v \cdot I_v \tag{11}$$

$$\delta V_w = R_w \cdot I_w \tag{12}$$

Furthermore, the three-phase voltage command value calculation part 61 determines the U-phase voltage command value $V_u^*$, V-phase voltage command value $V_v^*$ and W-phase voltage command value $V_w^*$ as the voltage command values, by adding the respective phase voltage drop values $\delta V_u$, $\delta V_v$, $\delta V_w$ to the respective phase target applied voltage values $V_u$, $V_v$, $V_w$ as shown by the following formulas (13) through (15).

$$V_u^* = V_u + \delta V_u \tag{13}$$

$$V_v^* = V_v + \delta V_v \tag{14}$$

$$V_w^* = V_w + \delta V_w \tag{15}$$

In the third embodiment, the PWM control parts 18u, 18v, 18w serve as the signal generating part for generating the PWM control signals according to the respective phase voltage command values $V_u^*$, $V_v^*$, $V_w^*$.

Figure 9:
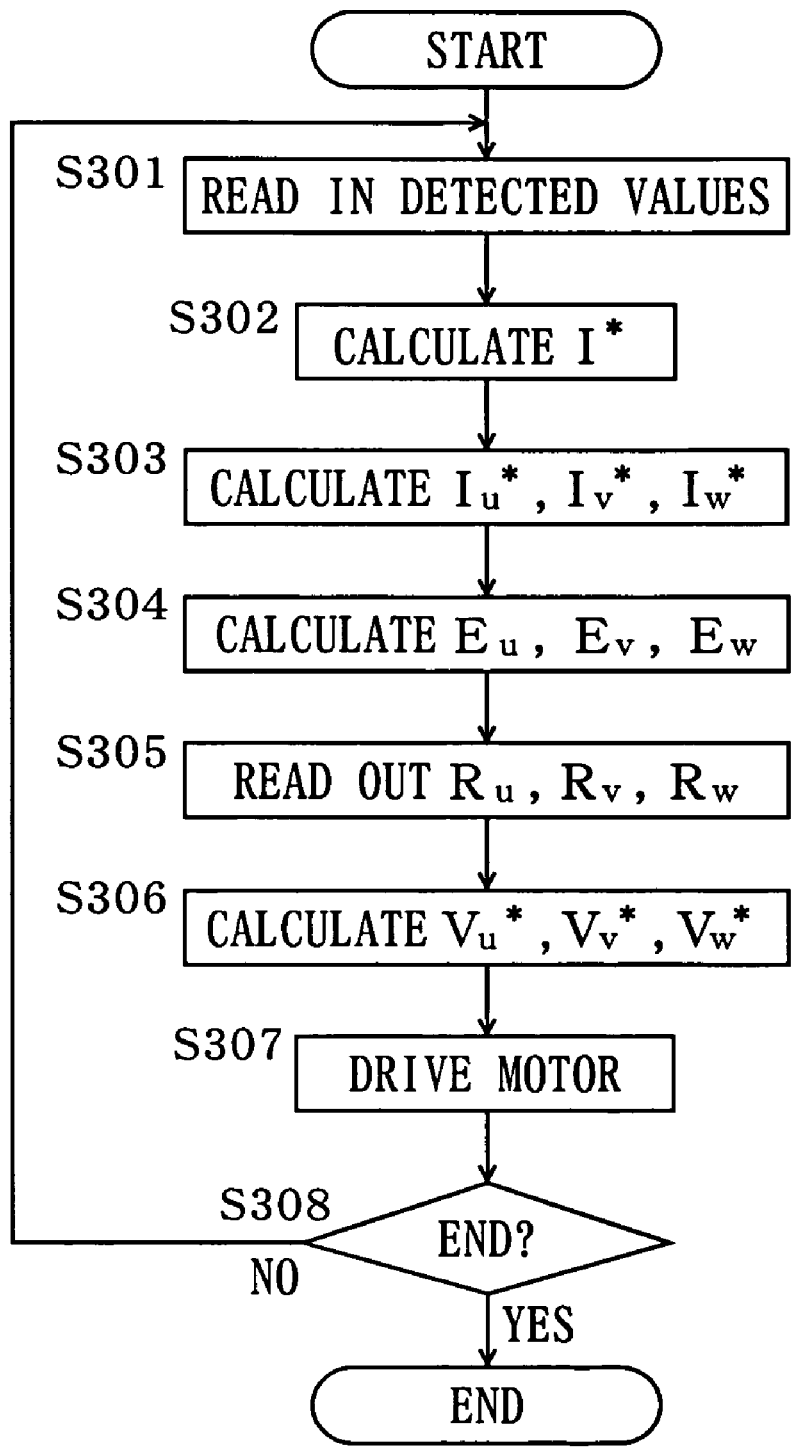
FIG. 9 is a flowchart showing control procedures of the motor controller of the third embodiment of the present invention.

The flowchart of FIG. 9 shows a control procedure with the controller 10 of the third embodiment for the motor 1. First, the detected values by the resolver 2, the torque sensor 7, the vehicle velocity sensor 8, the current detectors 11u, 11v, 11w and the voltage determination part 53 are read (step S301), and the basic target current value I* is calculated based on the detected torque and vehicle velocity (step S302). The respective phase current command values $I_u^*$, $I_v^*$, $I_w^*$ corresponding to the basic target current value I* are calculated (step S303), the speed electromotive forces $E_u$, $E_v$, $E_w$, which are determined based on the rotation positions of the rotor 1b detected in time series, are calculated (step S304), the respective phase equivalent resistance values $R_u$, $R_v$, $R_w$ corresponding to the respective phase current values $I_u$, $I_v$, $I_w$ determined by the current determination part 11 and the detected voltage value $V_E$ is read from the storage part 55 (step S305), and the respective phase voltage command values $V_u^*$, $V_v^*$, $V_w^*$ are calculated from the calculated current command values $I_u^*$, $I_v^*$, $I_w^*$, calculated speed electromotive forces $E_u$, $E_v$, $E_w$ of the respective phases, determined respective phase current values $I_u$, $I_v$, $I_w$, read respective phase equivalent resistance values $R_u$, $R_v$, $R_w$, and relation expressed by the formulas (7) through (15) (step S306). The PWM control signals corresponding to the calculated voltage command values $V_u^*$, $V_v^*$, $V_w^*$ of the respective phases are generated, and the motor 1 is driven by switching on and off the FETs 13u1, 13u2, 13v1, 13v2, 13w1, 13w2 by the PWM control signals (step S307), whether the control is to be ended is judged based on, for example, ON/OFF state of the ignition switch (step S308), and the processing flow returns to step S301 in a state where the control is not to be ended. Other features are similar to those of the first embodiment.

Figure 10:
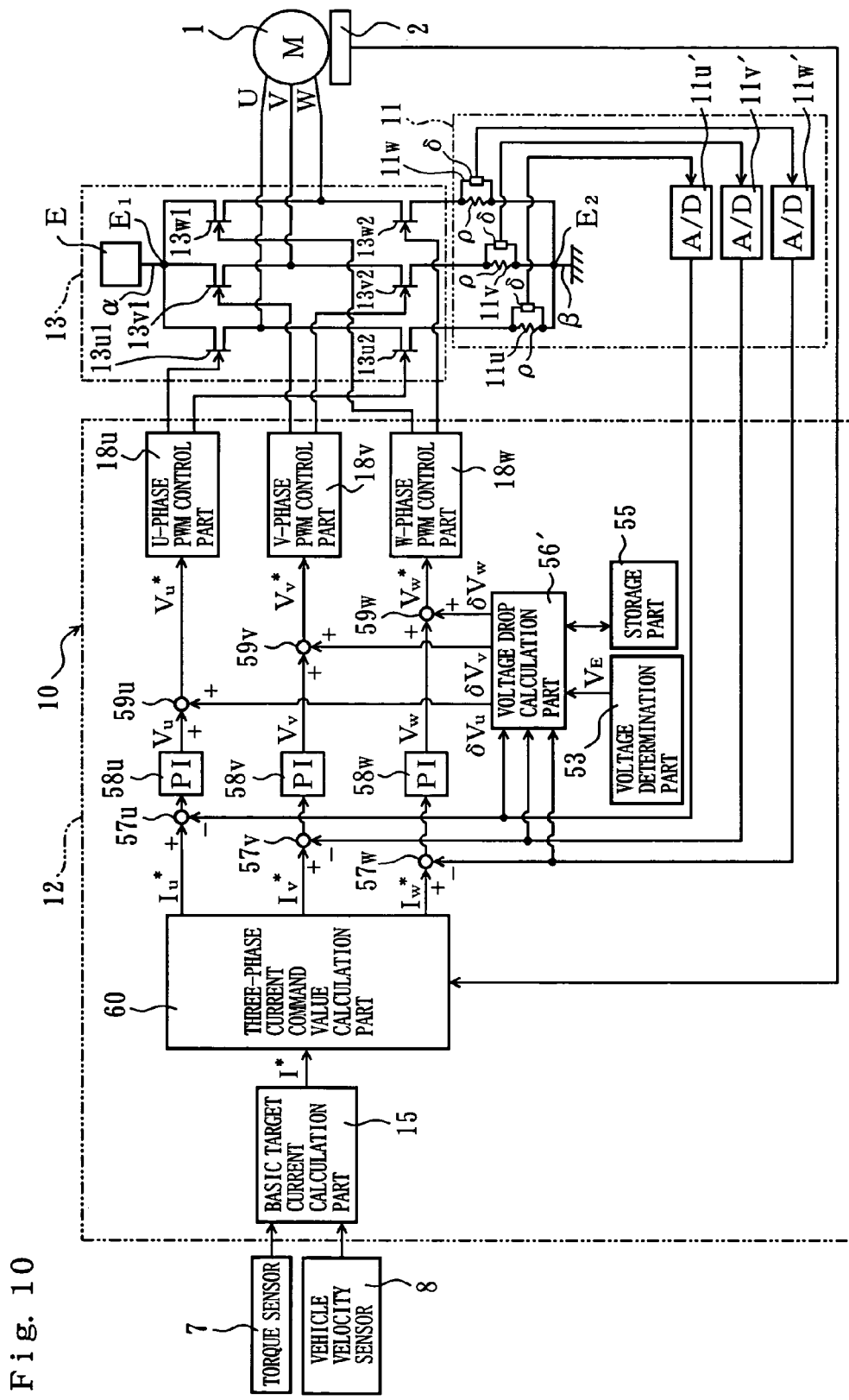
FIG. 10 is a drawing illustrating the constitution of a motor controller of the fourth embodiment of the present invention.

FIG. 10 shows a function block diagram of a controller 10 of the fourth embodiment. The difference in the fourth embodiment from the first embodiment is that the motor 1 is feedback controlled and the basic target current I* is determined from the respective phase voltage command values $V_u^*$, $V_v^*$, $V_w^*$ without carrying out the calculation in the dq coordinate system. The parts that are the same as the first embodiment are indicated by the same reference symbols, and the differences are explained.

The signal processing part 12 has a three-phase current command value calculation part 60, a voltage drop calculation part 56', a U-phase difference calculation part 57u, a V-phase difference calculation part 57v, a W-phase difference calculation part 57w, a U-phase PI calculation part 58u, a V-phase PI calculation part 58v, a W-phase PI calculation part 58w, a U-phase addition part 59u, a V-phase addition part 59v and a W-phase addition part 59w instead of the dq-axes current command value calculation part 50, the phase current coordinate conversion part 51, the dq-axes voltage command value calculation part 52 and the voltage coordinate conversion part 54 of the first embodiment.

The three-phase current command value calculation part 60 calculates the respective phase current command values $I_u^*$, $I_v^*$, $I_w^*$ as the current command values like in the third embodiment. Therefore, in the present embodiment, the basic target current calculation part 15 and the three-phase current command value calculation part 60 serve as the current command value determination part for determining the current command values corresponding to the target output of the motor 1.

The storage part 55 stores the respective phase equivalent resistance values $R_u$, $R_v$, $R_w$ as the equivalent resistance values like in the third embodiment.

The voltage drop calculation part 56' reads the respective phase equivalent resistance values $R_u$, $R_v$, $R_w$ from the storage part 55 based on the respective phase current values $I_u$, $I_v$, $I_w$ determined by the current determination part 11 and the voltage value $V_E$ determined by the voltage determination part 53, and determines the respective phase voltage drop values $\delta V_u$, $\delta V_v$, $\delta V_w$ as the voltage drop values from the respective phase equivalent resistance values $R_u$, $R_v$, $R_w$, respective phase current values $I_u$, $I_v$, $I_w$ and formulas (10) through (12), like the three-phase voltage command value calculation part 61 in the third embodiment.

The U-phase difference calculation part 57u determines the difference between the U-phase current command value $I_u^*$ and the U-phase current value $I_u$, and the U-phase target applied voltage value $V_u$ is determined by carrying out the PI calculation of the difference in the U-phase PI calculation part 58u. The V-phase difference calculation part 57v determines the difference between the V-phase current command value $I_v^*$ and the V-phase current value $I_v$, and the V-phase target applied voltage value $V_v$ is determined by carrying out the PI calculation of the difference in the V-phase PI calculation part 58v. The W-phase difference calculation part 57w determines the difference between the W-phase current command value $I_w^*$ and the W-phase current value $I_w$, and the W-phase target applied voltage value $V_w$ is determined by carrying out the PI calculation of the difference in the W-phase PI calculation part 58w. As a result, the respective phase difference calculation parts 57u, 57v, 57w and the respective phase PI calculation part 58u, 58v, 58w serve as the calculation part for determining the target applied voltage values to the motor 1 corresponding to the current command values.

The U-phase addition part 59u determines the U-phase voltage command value $V_u^*$ by adding the U-phase target applied voltage value $V_u$ and the U-phase voltage drop value $\delta V_u$ as expressed by the formula (13), the V-phase addition part 59v determines the V-phase voltage command value $V_v^*$ by adding the V-phase target applied voltage value $V_v$ and the V-phase voltage drop value $\delta V_v$ as expressed by the formula (14), the W-phase addition part 59w determines the W-phase voltage command value $V_w^*$ by adding the W-phase target applied voltage value $V_w$ and the W-phase voltage drop value $\delta V_w$ as expressed by the formula (15).

In the fourth embodiment, the PWM control parts 18u, 18v, 18w serve as the signal generating part for generating the PWM control signals according to the respective phase voltage command values $V_u^*, V_v^*, V_w^*$.

Figure 11:
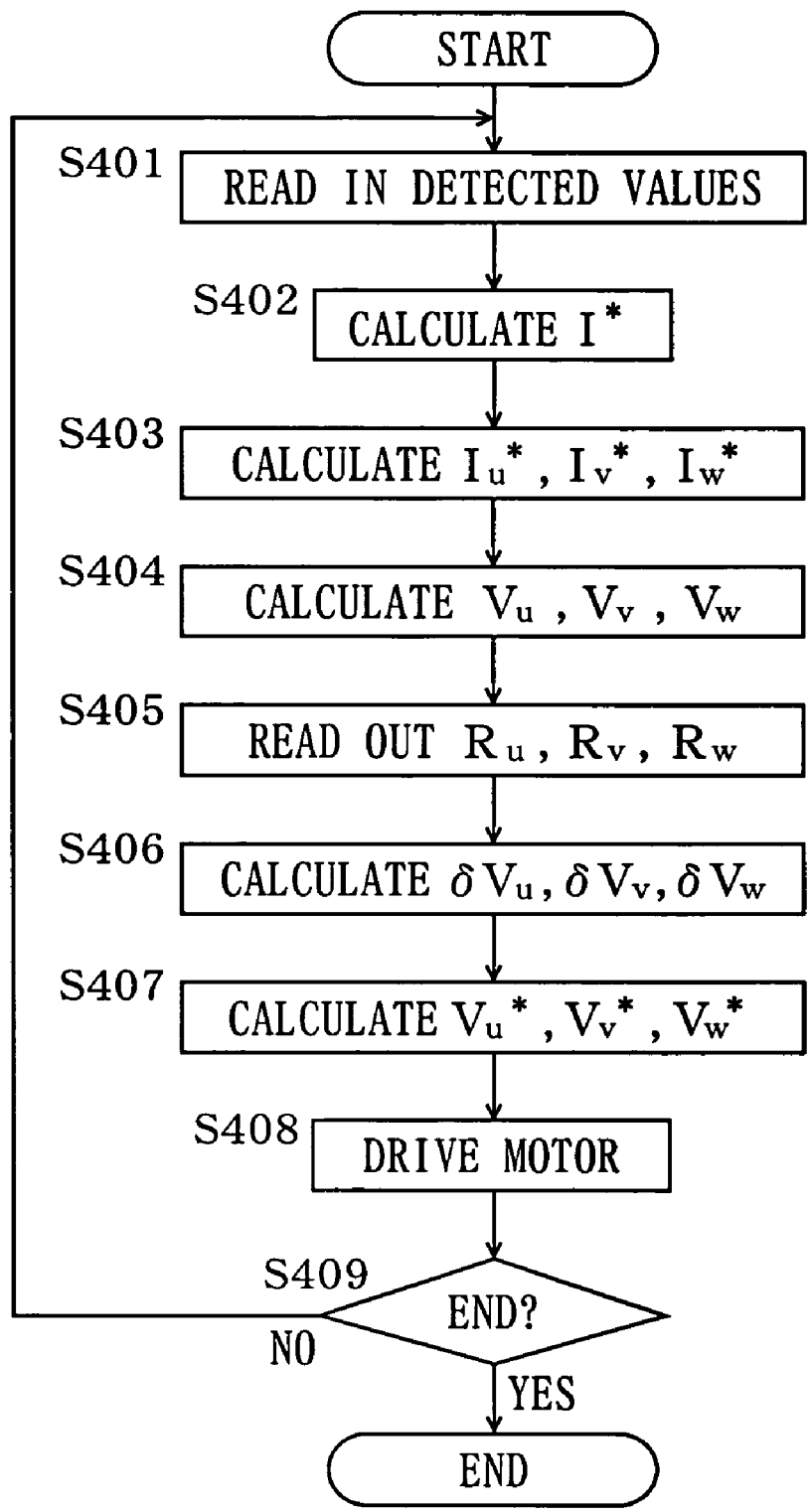
FIG. 11 is a flowchart showing control procedures of the motor controller of the fourth embodiment of the present invention.
Figure 12:
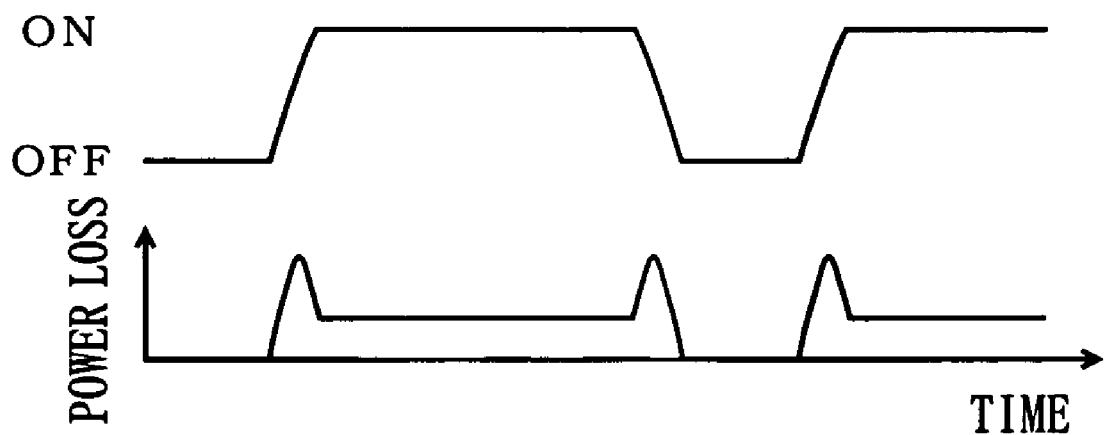
FIG. 12 is a drawing illustrating a relation between an operation timing of ON and OFF state of switching elements, power loss of the switching elements and time.

The flowchart of FIG. 11 shows a control procedure with the controller 10 of the fourth embodiment for the motor 1. First, the detected values by the resolver 2, the torque sensor 7, the vehicle velocity sensor 8, the current detectors 11u, 11v, 11w and the voltage determination part 53 are read (step S401), and the basic target current value I* is calculated based on the detected torque and vehicle velocity (step S402). The respective phase current command values $I_u^*, I_v^*, I_w^*$ corresponding to the basic target current value I* are calculated (step S403), the U-phase target applied voltage value $V_u$ is calculated by carrying out the PI calculation of the difference between the calculated U-phase current command value $I_u^*$ and the determined U-phase current value $I_u$, the V-phase target applied voltage value $V_v$ is calculated by carrying out the PI calculation of the difference between the calculated V-phase current command value $I_v^*$ and the determined V-phase current value $I_v$, and the W-phase target applied voltage value $V_w$ is calculated by carrying out the PI calculation of the difference between the calculated W-phase current command value $I_w^*$ and the determined W-phase current value $I_w$ (step S404). Further, the respective phase equivalent resistance values $R_u, R_v, R_w$ corresponding to the determined respective phase current values $I_u, I_v, I_w$ and voltage value $V_E$ are read from the storage part (step S405), the respective phase voltage drop values $\delta V_u, \delta V_v, \delta V_w$ are then calculated from the read respective phase equivalent resistance values $R_u, R_v, R_w$, determined respective phase current values $I_u, I_v, I_w$ and relation expressed by the formulas (10) through (12) (step S406), the U-phase voltage command value $V_u^*$ is calculated by adding the calculated U-phase target applied voltage value $V_u$ and the calculated U-phase voltage drop value $\delta V_u$, the V-phase voltage command value $V_v^*$ is calculated by adding the calculated V-phase target applied voltage value $V_v$ and the calculated V-phase voltage drop value $\delta V_v$, and the W-phase voltage command value $V_w^*$ is calculated by adding the calculated W-phase target applied voltage value $V_w$ and the calculated W-phase voltage drop value $\delta V_w$ (step S407). The PWM control signals corresponding to the calculated voltage command values $V_u^*, V_v^*, V_w^*$ of the respective phases are generated, and the motor 1 is driven by switching on and off the FETs 13u1, 13u2, 13v1, 13v2, 13w1, 13w2 by the PWM control signals (step S408), whether the control is to be ended is judged based on, for example, ON/OFF state of the ignition switch (step S409), and the processing flow returns to step S401 in a state where the control is not to be ended. Other features are similar to those of the first embodiment.

The present invention is not limited to the above-described embodiments. For example, the application of the motor controlled by the controller of the present invention is not particularly limited. Further, the number of phases and type of the motor is not limited, and the present invention can be applied to a brush motor. Furthermore, each value corresponding to the equivalent resistance stored in the storage part is not limited to the equivalent resistance value itself, for example, the equivalent resistance value can be substantially stored by storing the voltage value, which is obtained by multiplying the equivalent resistance value by a current value, with related to the current value. In this case, the voltage value related to the current value that is determined by the current determination part can be read from the storage part as the voltage drop value. Furthermore, when the output of the motor is controlled under a condition where the fluctuation of the equivalent resistance value is small, the value corresponding to the equivalent resistance stored in the storage part can be constant.

What is claimed is:

1. A motor controller for controlling output of a motor by switching on and off switching elements arranged in a power supply line to said motor by control signals, comprising a current command value determination part for determining current command values corresponding to a target output of said motor;

a calculation part for determining target applied voltage values to said motor corresponding to said current command values;

a storage part for storing values corresponding to predetermined equivalent resistance which corresponds to power loss generated by switching on and off said switching elements;

a current determination part for determining values of current flowing in said switching elements;

a calculation part for determining voltage command values by adding voltage drop values determined from the values corresponding to said equivalent resistance and the values of current flowing in said switching elements to said target applied voltage values; and a signal generating part for generating said control signals according to said voltage command values.

2. The motor controller according to claim 1, further comprising a voltage determination part for determining values of voltage applied to said switching elements, wherein values which correspond to the values of current flowing in said switching elements determined by said current determination part and the values of voltage applied to said switching elements determined by said voltage determination part are stored as the values corresponding to said equivalent resistance.

3. The motor controller according to claim 1, wherein an output of a three-phase brushless motor is open-loop controlled as the output of said motor via an inverter circuit constituted of said switching elements, U-phase current value, V-phase current value and W-phase current value which are values of current flowing in the respective three-phase coils constituting an armature winding of said motor are determined as values of current flowing in said switching elements, said motor controller further comprises a rotation position determination part for determining rotation positions of a rotor of said motor, a calculation part for calculating an angular velocity of said rotor based on said rotation positions, and a phase current coordinate conversion part for calculating a d-axis current value and a q-axis current value based on said U-phase current value, said V-phase current value, said W-phase current value and said rotation positions, in which an axis along the magnetic flux direction of field system of the rotor is taken as the d-axis, and an axis perpendicular to the d-axis and the rotation axis of the rotor is taken as the q-axis, said current command value determination part has dq-axes current command value calculation part for determining a d-axis current command value and a q-axis current command value as said current command values based on the target output of said motor, a d-axis equivalent resistance value and a q-axis equivalent resistance value are stored as the values corresponding to said equivalent resistance, a d-axis target applied voltage value $V_d$ and a q-axis target applied voltage value $V_q$ are determined as said target applied voltage values from the following formulas (1) and (2), $$V_d = (R + PL_d) \cdot I_d^* - \omega \cdot L_q \cdot I_q^* \qquad (1)$$

$$V_q = (R + PL_q) \cdot I_q^* - \omega \cdot L_d \cdot I_d^* + \omega \cdot \Phi \qquad (2)$$

a d-axis voltage drop value $\delta V_d$ and a q-axis voltage drop value $\delta V_q$ are determined as said voltage drop values from the following formulas (3) and (4), $$\delta V_d = R_d \cdot I_d \qquad (3)$$

$$\delta V_q = R_q \cdot I_q \qquad (4), \text{and}$$

a d-axis voltage command value $V_d^*$ and a q-axis voltage command value $V_q^*$ are determined as said voltage command values from the following formulas (5) and (6), $$V_d^* = V_d + \delta V_d \qquad (5)$$

$$V_q^* = V_q + \delta V_q \qquad (6),$$

in formulas (1) through (6), $R_d$ stands for a d-axis equivalent resistance value, $R_q$ stands for a q-axis equivalent resistance value, $I_d$ stands for a d-axis current value, $I_q$ stands for a q-axis current value, R stands for a predetermined resistance value of said three-phase coils, P stands for a differential operator, $L_d$ stands for a predetermined d-axis self-inductance of said three-phase coils, $L_q$ stands for a predetermined q-axis self-inductance of said three-phase coils, $I_d^*$ stands for a d-axis current command value, $I_q^*$ stands for a q-axis current command value, $\omega$ stands for an angular velocity of said rotor, $\Phi$ is a value predetermined by multiplying a maximum value of magnetic flux linkage of said three-phase coils by $(3/2)^{1/2}$.

4. The motor controller according to claim 2, wherein an output of a three-phase brushless motor is open-loop controlled as the output of said motor via an inverter circuit constituted of said switching elements, U-phase current value, V-phase current value and W-phase current value which are values of current flowing in the respective three-phase coils constituting an armature winding of said motor are determined as values of current flowing in said switching elements, said motor controller further comprises a rotation position determination part for determining rotation positions of a rotor of said motor, a calculation part for calculating an angular velocity of said rotor based on said rotation positions, and a phase current coordinate conversion part for calculating a d-axis current value and a q-axis current value based on said U-phase current value, said V-phase current value, said W-phase current value and said rotation positions, in which an axis along the magnetic flux direction of field system of the rotor is taken as the d-axis, and an axis perpendicular to the d-axis and the rotation axis of the rotor is taken as the q-axis, said current command value determination part has dq-axes current command value calculation part for determining a d-axis current command value and a q-axis current command value as said current command values based on the target output of said motor, a d-axis equivalent resistance value and a q-axis equivalent resistance value are stored as the values corresponding to said equivalent resistance, a d-axis target applied voltage value $V_d$ and a q-axis target applied voltage value $V_q$ are determined as said target applied voltage values from the following formulas (1) and (2), $$V_d = (R + PL_d) \cdot I_d^* - \omega \cdot L_q \cdot I_q^* \qquad (1)$$

$$V_q = (R + PL_q) \cdot I_q^* - \omega \cdot L_d \cdot I_d^* + \omega \cdot \Phi \qquad (2)$$

a d-axis voltage drop value $\delta V_d$ and a q-axis voltage drop value $\delta V_q$ are determined as said voltage drop values from the following formulas (3) and (4), $$\delta V_d = R_d \cdot I_d \qquad (3)$$

$$\delta V_q = R_q \cdot I_q \qquad (4), \text{and}$$

a d-axis voltage command value $V_d^*$ and a q-axis voltage command value $V_q^*$ are determined as said voltage command values from the following formulas (5) and (6), $$V_d^* = V_d + \delta V_d \qquad (5)$$

$$V_q^* = V_q + \delta V_q \qquad (6),$$

in formulas (1) through (6), $R_d$ stands for a d-axis equivalent resistance value, $R_q$ stands for a q-axis equivalent resistance value, $I_d$ stands for a d-axis current value, $I_q$ stands for a q-axis current value, R stands for a predetermined resistance value of said three-phase coils, P stands for a differential operator, $L_d$ stands for a predetermined d-axis self-inductance of said three-phase coils, $L_q$ stands for a predetermined q-axis self-inductance of said three-phase coils, $I_d^*$ stands for a d-axis current command value, $I_q^*$ stands for a q-axis current command value, $\omega$ stands for an angular velocity of said rotor, $\Phi$ is a value predetermined by multiplying a maximum value of magnetic flux linkage of said three-phase coils by $(3/2)^{1/2}$.

* * * * *